United States Patent
Fujiwara (10) Patent No.: US 8,813,883 B2
(45) Date of Patent: Aug. 26, 2014

(54) POWER PLANT FOR HYBRID MOTOR VEHICLE

(71) Applicant: Suzuki Motor Corporation, Shizuoka (JP)

(72) Inventor: Nobutaka Fujiwara, Shizuoka (JP)

(73) Assignee: Suzuki Motor Corporation, Shizuoka (JP)

( * ) Notice: Subject to any disclaimer, the term of this patent is extended or adjusted under 35 U.S.C. 154(b) by 0 days.

(21) Appl. No.: 13/795,110

(22) Filed: Mar. 12, 2013

(65) Prior Publication Data
US 2013/0264132 A1 Oct. 10, 2013

(30) Foreign Application Priority Data
Apr. 4, 2012 (JP) ................................. 2012-085248

(51) Int. Cl.
*B60K 6/46* (2007.10)
*B60K 6/40* (2007.10)
*B60K 5/04* (2006.01)

(52) U.S. Cl.
CPC ... *B60K 6/46* (2013.01); *B60K 5/04* (2013.01); *Y10S 903/951* (2013.01); *B60K 6/40* (2013.01); *Y02T 10/6217* (2013.01)
USPC .......................... 180/65.22; 180/312; 903/951

(58) Field of Classification Search
CPC .............. B60K 5/12; B60K 1/00; B60K 1/02; B60K 5/1216; B60K 6/46
USPC ......... 180/65.22, 65.245, 291, 297, 311, 312; 903/951
See application file for complete search history.

(56) References Cited

U.S. PATENT DOCUMENTS

| | | | |
|---|---|---|---|
| 5,101,928 A * | 4/1992 | O'Connor .................... | 180/291 |
| 5,193,642 A * | 3/1993 | Miyake ........................ | 180/312 |
| 7,040,446 B2 * | 5/2006 | Anzai et al. .................. | 180/312 |
| 7,393,016 B2 * | 7/2008 | Mitsui et al. ................. | 280/784 |
| 7,588,117 B2 * | 9/2009 | Fukuda ........................ | 180/291 |
| 8,479,868 B2 * | 7/2013 | Wakatsuki et al. ........... | 180/299 |
| 8,584,789 B2 * | 11/2013 | Dusi et al. .................... | 180/382 |
| 8,596,403 B2 * | 12/2013 | Cunningham et al. ........ | 180/300 |
| 2011/0073394 A1 | 3/2011 | Wakatsuki | |
| 2012/0090912 A1 * | 4/2012 | Gannon et al. ............... | 180/312 |
| 2012/0292124 A1 * | 11/2012 | Yamashita et al. ........... | 180/291 |

FOREIGN PATENT DOCUMENTS

JP 2011-68229 A 4/2011

* cited by examiner

*Primary Examiner* — John Walters
*Assistant Examiner* — Brian Swenson
(74) *Attorney, Agent, or Firm* — Rothwell, Figg, Ernst & Manbeck, P.C.

(57) ABSTRACT

A hybrid vehicle power unit includes an engine, a generator and a traction motor. A mounting bracket includes a base portion and a plurality of junctions arranged along the outer edge of an end of the generator at a plurality of points spaced at interval to fasten the base portion to the end. Dividing the end by an imaginary vertical plane that includes a rotor axis of the generator into a front area and a rear area with respect to the longitudinal axis of the vehicle, the number of some of the plurality of junctions located in the rear area is larger than the number of the remainder of the plurality of junctions located in the front area. A generator mount between an end portion of the mounting bracket and a side member is arranged in front of the imaginary vertical plane with respect to the longitudinal axis.

6 Claims, 8 Drawing Sheets

POWER PLANT FOR HYBRID MOTOR VEHICLE

RELATED APPLICATION

The present application claims priority to Japanese Patent Application No. 2012-085248 filed on Apr. 4, 2012, the entire content of which is being incorporated herein by reference.

TECHNICAL FIELD

The present invention relates to a power unit for a hybrid vehicle, and more particularly to a power unit for a hybrid vehicle, including an engine, a generator and a traction motor, and configured to be attached to the vehicle body using mounts.

BACKGROUND ART

Most series-hybrid automobiles have a generator driven by an engine to recharge a battery unit. Battery unit powers an electric traction motor. The traction motor drives at least one driving wheel of a series-hybrid automobile. Some power units installed in such hybrid automobiles, called hybrid-automobile power units, have an engine with an engine crankshaft oriented along a transverse direction (side to side) of an automobile, a generator attached to one of those two ends of the engine which are distant along the transverse axis and an electric traction motor located on the rear, with respect to a longitudinal axis (front to back) of the automobile, side of the generator. One example of structures for attaching a power unit to the vehicle chassis is known in which the power plant is attached to the vehicle chassis by mounts (see, for example, patent literature 1). The mounts include a cylindrical inner race, an anti-vibration rubber that encircles the cylindrical inner race and a cylindrical outer race that encircles the anti-vibration rubber.

In such known structure, the mount for a generator side of the power unit is attached to a side-member side of the vehicle chassis positioned in a lateral location with respect to the generator. In more detail, this mount is positioned with an axis of its cylindrical inner race oriented along a transverse direction of an automobile and attached to vertical walls of an inverter mounting bracket or vertical walls of a side member by a bolt inserted into the cylindrical inner race. The cylindrical outer race of this mount is connected to a mounting bracket provided for the generator side of the power unit. This mounting bracket is fastened to a plurality of points on that end face of the generator which is oriented along the transverse direction of the automobile.

PRIOR ART DOCUMENT

Patent Literature

Patent Literature 1: JP-A 2011-068229

In the above-mentioned structure for attaching the power unit, a space defined between the cylindrical inner race of the mount and the generator is small because this mount is positioned in a lateral location with respect to the generator (or a location spaced from the generator along the transverse direction of the automobile). This may cause a worker to feel some difficulty in inserting a tool configured to tighten (or loosen) a bolt into the space along the axis of the cylindrical inner race to remove and then mount the power unit from and to the vehicle body during the work of maintaining the power unit. On the other hand, the worker may feel some difficulty in inserting the tool into a space surrounding where the mounting bracket is attached to the generator because there is a need to avoid interference with a sidewall of the mounting bracket. The above-mentioned difficulties found in the structure may be signs of a drop in workability of assembling the mounting bracket with the generator and the mount.

When a power unit needs to be removed from under an automobile, firstly, all of the vehicle structural members under the power unit (for example, an underpanel, side members, a stabilizer and the like), which are large in size, are removed after the vehicle has been raised up in the air. Subsequently, plural junctions (bolts) attaching a mounting bracket for the generator side of the power unit to the adjacent mount are removed before removing the power unit. The known structure for attaching the power unit to the vehicle chassis increases worker's workload because of the hard and skilled labor to disconnect and reconnect the vehicle body and vehicle structural members (particularly, side members) caused due to difficulty in inserting the tool under interference with a sidewall of the mounting bracket as mentioned in the foregoing description.

In the known structure for attaching the power unit, there is the possibility that one of junctions used to attach the mounting bracket to the generator side of the power unit is located nearer the joint between the generator and the traction motor than the other junctions. This causes concentrated transmission of load to the junction located near the joint between the generator and the traction motor when large vibrations of the traction motor are transmitted to the generator upon start-up of the automobile. This may be signs of a short life of the junctions between the mounting bracket and the generator because concentration of stress on the one of the junctions attaching the mounting bracket to the generator side of the power unit deteriorates the junctions on the generator side of the power unit.

SUMMARY OF THE INVENTION

An object of the present invention is to provide a power unit for a hybrid vehicle which provides a long life and improved worker's workability.

According to one aspect of the present invention, there is provided a power unit for a hybrid vehicle, the hybrid vehicle including a vehicle body having an engine compartment, and a pair of side members spaced in a transverse direction toward both sides of the vehicle within the engine compartment and extending along a longitudinal axis of the vehicle, the power unit comprising:

an engine having a crankshaft with the crankshaft axis oriented along the transverse direction of the vehicle;

a generator connected to one end of the engine with respect to the crankshaft axis;

a traction motor, located in the rear of the generator with respect to the longitudinal axis of the vehicle, connected to the generator in a direction along a line that meets the crankshaft axis at right angles;

a mounting bracket protruding from that one end of the generator's axially spaced, along the transverse direction of the vehicle, ends which is not adjacent the engine, the mounting bracket having a base portion in contact with the end of the generator, the base portion of the mounting bracket having an outline extending along an outer edge of the end of the generator and a plurality of junctions arranged along the outer edge of the end at a plurality of points spaced at interval to fasten the base portion to the end of the generator, the plurality of junctions being arranged such that dividing the end of the generator by an imaginary vertical plane that includes a rotor axis of the generator into a front area and a rear area with respect to the longitudinal axis of the vehicle, the number of some of the plurality of junctions located in the rear area is larger than the number of the remainder of the plurality of junctions located in the front area; and a generator mount between an end portion of the mounting bracket and one of the pair of side members and arranged in front of the imaginary vertical plane with respect to the longitudinal axis of the vehicle.

In the first aspect, preferably, within an area where the generator and the traction motor meet each other, there are a plurality of joints spaced along the circumference of an imaginary circle about a rotor axis of said traction motor in a side view viewing the area in a direction along the rotor axis, and the junctions and the joints are arranged alternately along the circumference of the generator in the neighborhood of the area where the generator and the traction motor meet each other.

According to a second aspect of the present invention, there is provided a power unit for a hybrid vehicle, the hybrid vehicle including a vehicle body having an engine compartment, and a pair of side members spaced in a transverse direction toward both sides of the vehicle within the engine compartment and extending along a longitudinal axis of the vehicle, the power unit comprising:

an engine having a crankshaft with the crankshaft axis oriented along the transverse direction of the vehicle;

a generator connected to one end of the engine with respect to the crankshaft axis;

a traction motor, located in the rear of the generator with respect to the longitudinal axis of the vehicle, connected to the generator in a direction along a line that meets the crankshaft axis at right angles;

a mounting bracket protruding from that one end of the generator's axially spaced, along the transverse direction of the vehicle, ends which is not adjacent the engine, the mounting bracket having a base portion in contact with the end of the generator, the base portion of the mounting bracket having an outline extending along an outer edge of the end of the generator and a plurality of junctions arranged along the outer edge of the end at a plurality of points spaced at interval to fasten the base portion to the end of the generator, the plurality of junctions being arranged such that dividing the end of the generator by an imaginary vertical plane that includes a rotor axis of the generator into a front area and a rear area with respect to the longitudinal axis of the vehicle, the number of some of the plurality of junctions located in the rear area is larger than the number of the remainder of the plurality of junctions located in the front area; and a generator mount between an end portion of the mounting bracket and one of the pair of side members and arranged in front of the imaginary vertical plane with respect to the longitudinal axis of the vehicle, the generator mount including a cylindrical outer race, a cylindrical inner race within the outer race, an anti-vibration rubber between the cylindrical outer race and the cylindrical inner race, and a support shaft that passes through the cylindrical inner race, the cylindrical inner race having an axis oriented along the transverse direction of the vehicle with one and the opposite ends of said support shaft being supported on the side member, the cylindrical outer race having a bottom fastened to an upper surface of the one end portion of the mounting bracket by junctions at a plurality of points.

In the second aspect, preferably, the one and the opposite end of the support shaft are fastened to an inverter bracket attached to the side member.

In the second aspect, preferably, the cylindrical inner race of said generator mount has an axis arranged in front of the front side portion of the generator with respect to the longitudinal axis of the vehicle.

In the second aspect, preferably, within an area where the generator and the traction motor meet each other, there are a plurality of joints spaced along the circumference of an imaginary circle about a rotor axis of said traction motor in a side view viewing the area in a direction along the rotor axis, and the junctions and the joints are arranged alternately along the circumference of the generator in the neighborhood of the area where the generator and the traction motor meet each other.

According to the present invention, there is provided a power unit for a hybrid vehicle which provides a long life and improved worker's workability.

DESCRIPTION OF IMPLEMENTATION(S)

Figure 1:
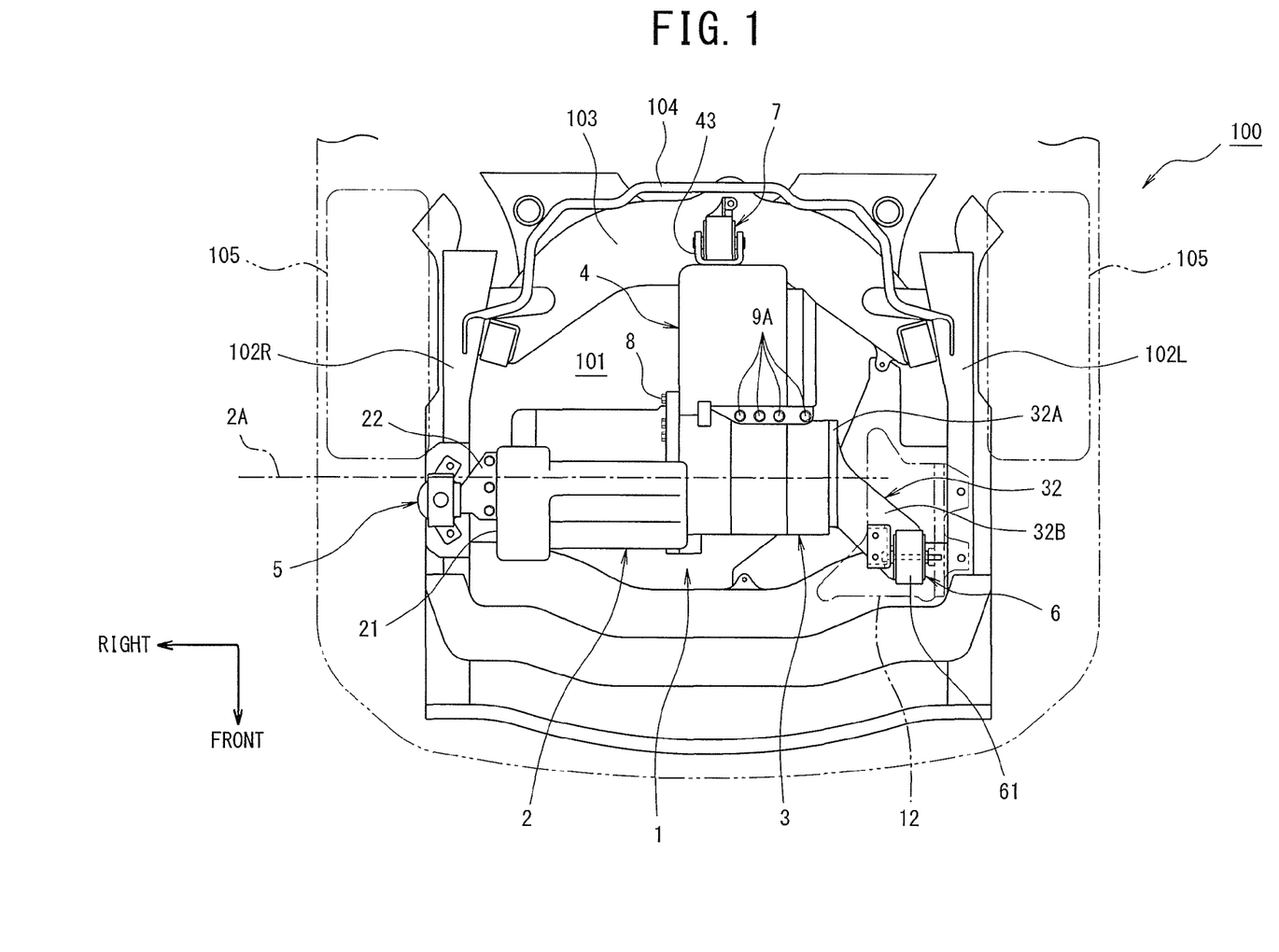
FIG. 1 is a plan view showing a front part of a hybrid vehicle that carries one implementation of a power unit for a hybrid vehicle according to the present invention.
Figure 2:
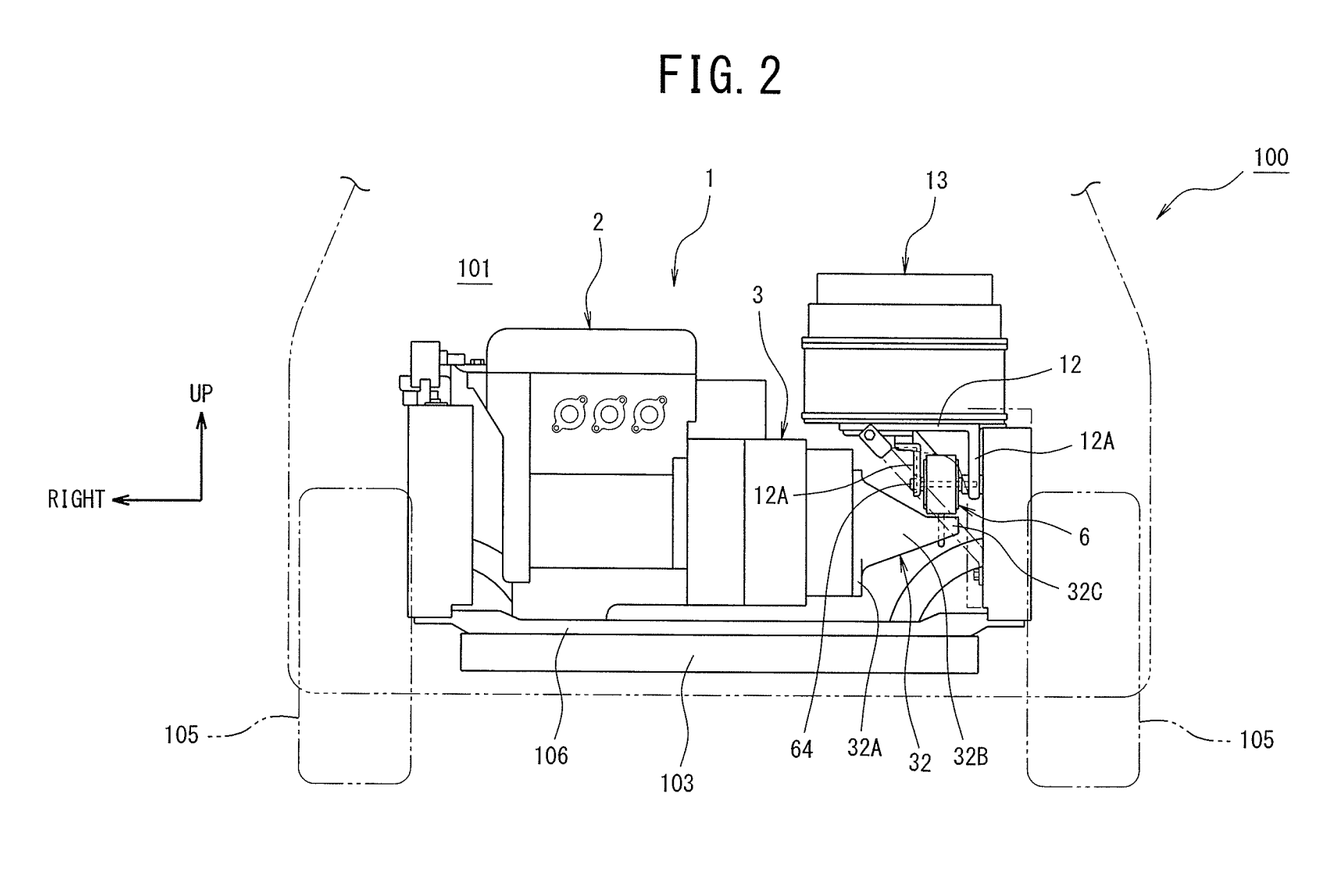
FIG. 2 is a front view showing the front part of the hybrid vehicle shown in FIG. 1.
Figure 3:
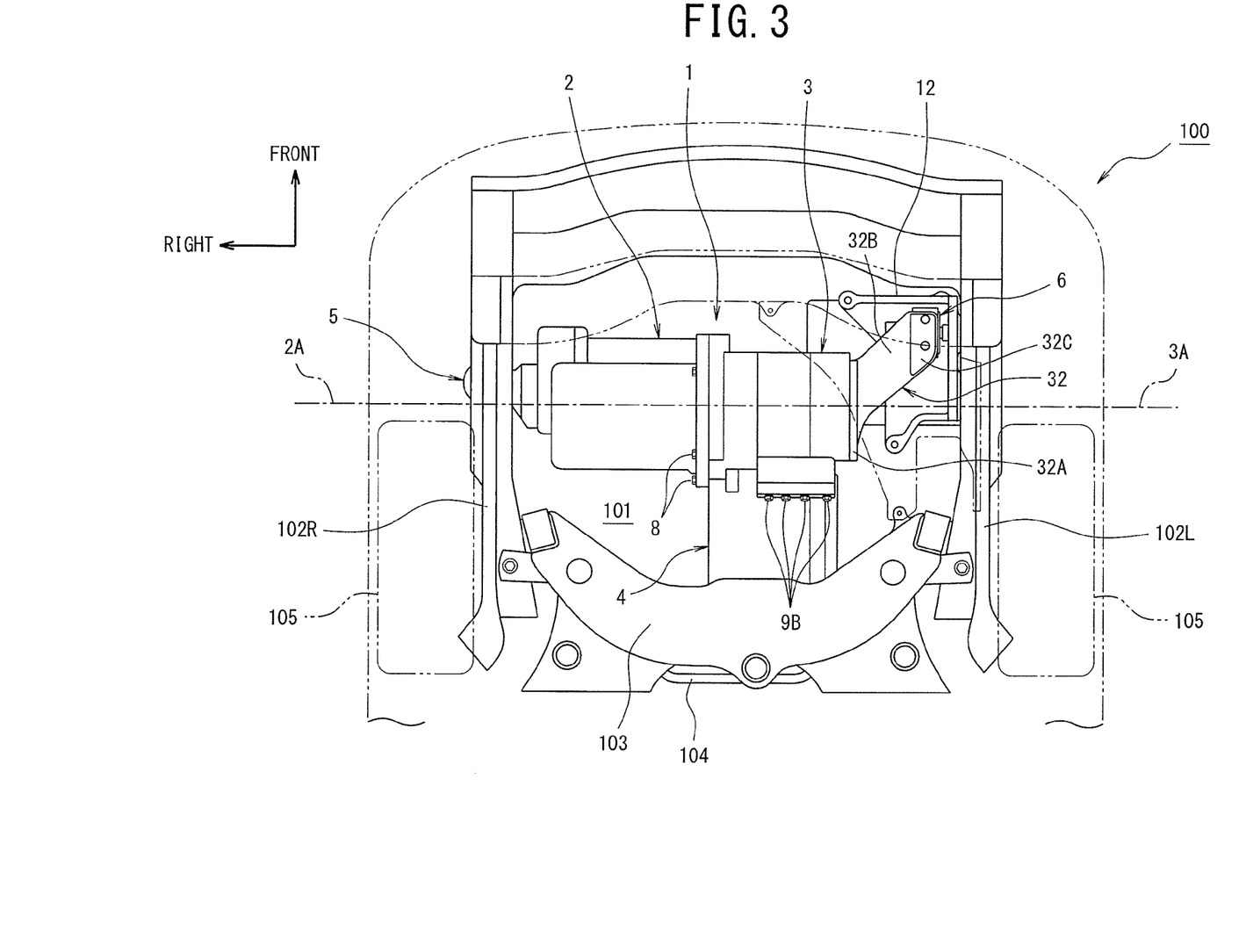
FIG. 3 is a bottom view showing the front part of the hybrid vehicle shown in FIG. 1.

Referring to the accompanying drawings, the present invention will be explained in greater detail below by way of one implementation of a power unit (called a "power unit" below) for a hybrid vehicle. Throughout all of figures in the drawings, the same reference numerals are used for identical or essentially identical elements. FIG. 1 is a plan view of the front part of a hybrid vehicle (called a "vehicle" below) 100. FIG. 2 is a front view of the front part of the vehicle 100. FIG. 3 is a bottom view of the front part of the vehicle 100 with an underpanel removed. In the figures, arrows are used to indicate a longitudinal axis of the vehicle (front to back), a transverse direction of the vehicle (side to side) and a vertical direction of the vehicle (up to down) for ease of explanation.

(Overview of Vehicle)

Referring to FIGS. 1 to 3, an implementation of a power unit 1 is mounted inside an engine compartment 101 of a front part of the vehicle 100. The vehicle 100 includes within an engine compartment 101 a pair of side members 102R and 102L deviated from a longitudinal axis of the vehicle (front to back) in one and the opposite directions along a transverse direction of the vehicle (side to side) toward both sides of the vehicle and extending along the longitudinal axis. Provided in the rear lower portion of the engine compartment 101 is a sub frame 103 extending along the transverse direction of the vehicle. Provided above the sub frame 103 is a stabilizer 104 extending along the transverse direction of the vehicle. At both ends deviated from the longitudinal axis of the vehicle in one and the opposite directions along the transverse direction of the vehicle, each of the sub frame 103 and stabilizer 104 is connected to driving wheels on both sides of the vehicle. Provided in the front lower portion of the engine compartment 101 is a lower member 106 extending along the transverse direction of the vehicle.

(Construction of Power Unit)

Figure 4:
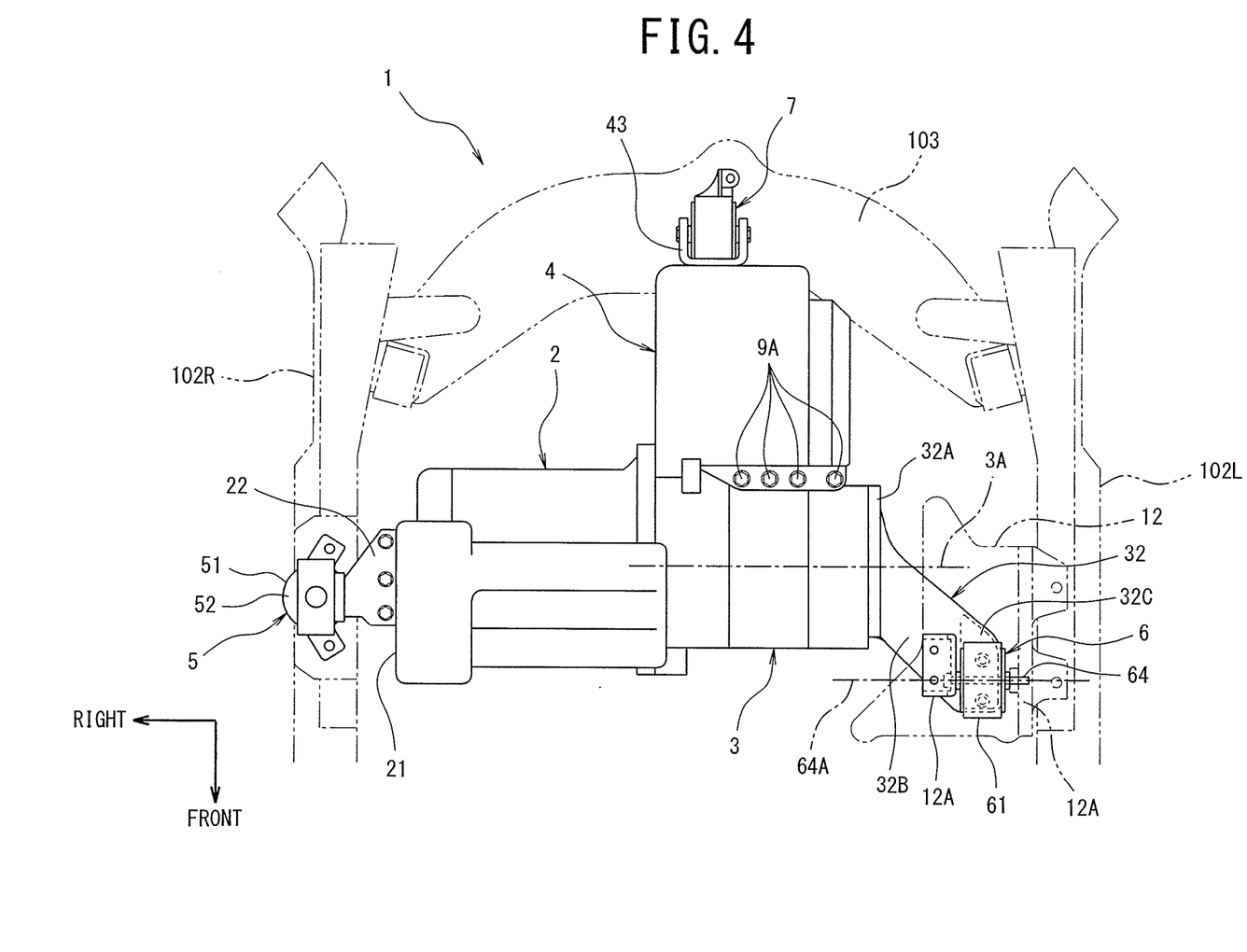
FIG. 4 is a plan view of the power unit shown in FIG. 1.

As shown in FIGS. 1 and 3, the power unit 1 includes an engine 2, a generator 3 that is connected integrally to an end portion of a crankshaft of the engine 2 having a crankshaft axis 2A and a traction motor 4 connected integrally to the generator 3 at its attachment surface oriented along a line that meets the crankshaft axis 2A at right angles. According to the present implementation, the crankshaft axis 2A of the engine 2, a rotor axis 3A of the generator 3 and an axis of the traction motor 4 extend in the same direction along the transverse direction (side to side) of the vehicle 100. As shown in FIGS. 1 and 4, the power unit 1 is attached to the vehicle 100 by an engine mount 5, a generator mount 6 and a traction motor mount 7.

(Engine)

As shown in FIG. 1, the engine 2 is connected to the adjacent generator 3 in a way that the revolution made by the crankshaft, not illustrated, is transmitted to a rotor, not illustrated, of the generator 3. The engine 2 and generator 3 are joined with their end faces meeting each other and held by bolts 8 at a plurality of circumferentially spaced fastening points along an outer edge of the junction. The engine 2 has a mounting bracket 22 protruding to the right along the transverse direction of the vehicle 100 from that one end 21 (on the right side of the vehicle) of its axially spaced, along the transverse direction of the vehicle 100, ends which is not adjacent the generator 3. The mounting bracket 22 is attached to the side member 102R via the above-mentioned engine mount 5.

(Engine Mount)

As shown in FIG. 4, the engine mount 5 includes a cylindrical outer race 51, an anti-vibration rubber 52 located inside the outer race 51 and a cylindrical inner race, not illustrated, located inside the anti-vibration rubber 52. This engine mount 5 is set such that the axis of the cylindrical outer race 51 and the axis of the cylindrical inner race are oriented along the vertical direction of the vehicle 100. The cylindrical outer race 51 is attached to the upper wall portion of the side member 102R. The head of the mounting bracket 22 provided on the end 21 of the engine 2 is fixed to the cylindrical inner race side, not illustrated, of the engine mount 5. With this engine mount 5, the load from the engine 2 side of the power unit 1 is imparted to the cylindrical inner race via the mounting bracket 22 and vibrations transmitted from the engine 2 side of the power unit 1 are absorbed due to the damper function of the anti-vibration rubber 52. In the present implementation, the work using the tool configured to tighten (or loosen) a bolt becomes easy because the engine mount 5 is attached to the upper wall portion of the side member 102R. Impact wrenches or sockets are examples of such tool.

Figure 5:
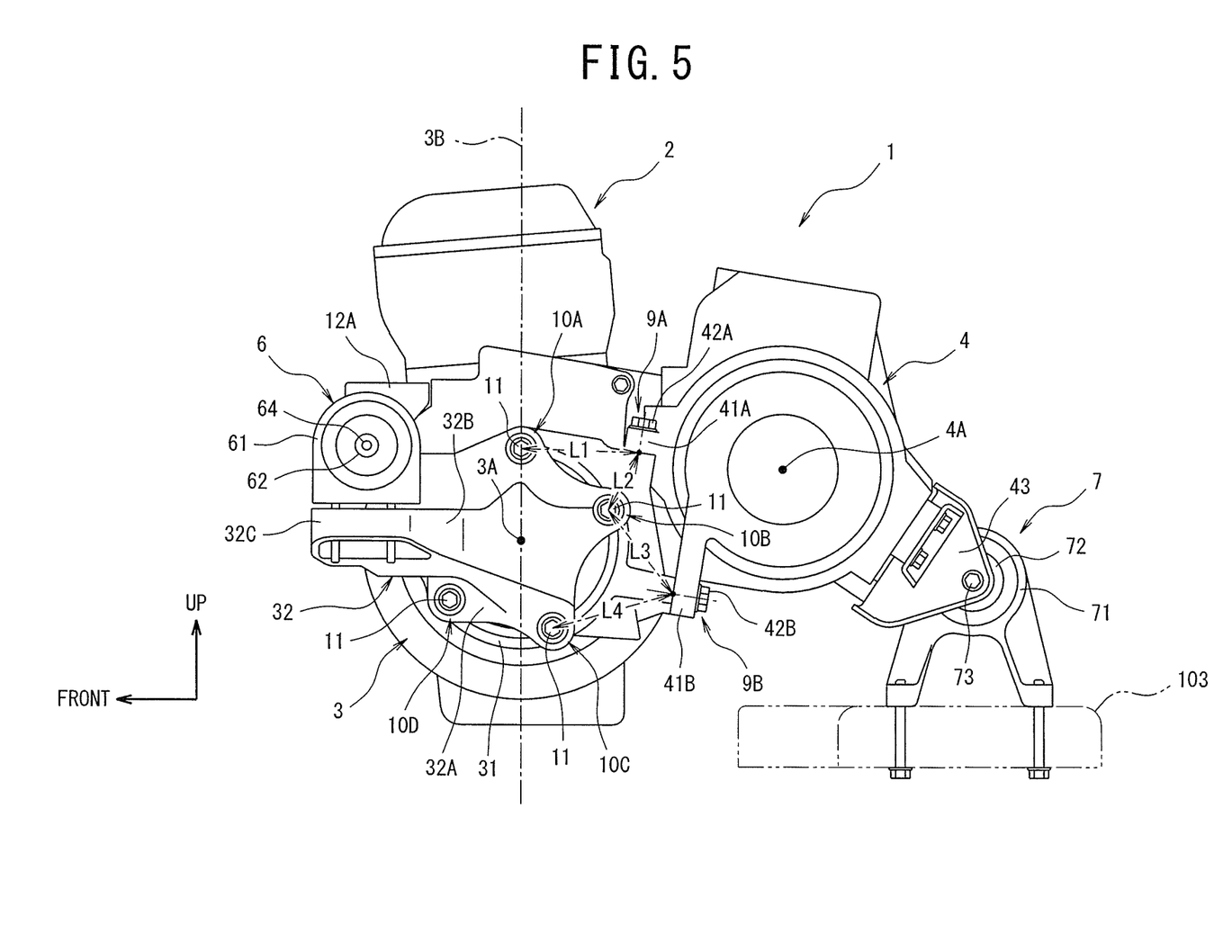
FIG. 5 is a side view of the power unit shown in FIG. 4.

As shown in FIG. 1, a plurality of upper joints 9A are provided on an upper portion of the abutment between the generator 3 and traction motor 4 in such a way as to form a row along the transverse direction of the vehicle 100. As shown in FIG. 3, a plurality of lower joints 9B are provided on a lower portion of the abutment between the generator 3 and traction motor 4 in such a way as to form a row along the transverse direction of the vehicle 100. As shown in FIG. 5, the upper joints 9A include a connecting bracket 41A and bolts 42A in which the connecting bracket 41A is fixed to the generator 3 side of the power unit 1 by the bolts 42A. Similarly, the lower joints 9B include a connecting bracket 41B and bolts 42B in which the connecting bracket 41B is fixed to the generator 3 side of the power unit 1 by the bolts 42B. As shown in FIG. 5, within an area where the generator 3 and traction motor 4 are in contact with each other, there are a plurality of (two) joints (each of the upper joints 9A and the corresponding one of the lower joints 9B) spaced along the circumference of an imaginary circle about a rotor axis 4A of the traction motor 4 in a side view viewing the above-mentioned area in the transverse direction of the vehicle 100.

(Traction Motor)

Figure 8:
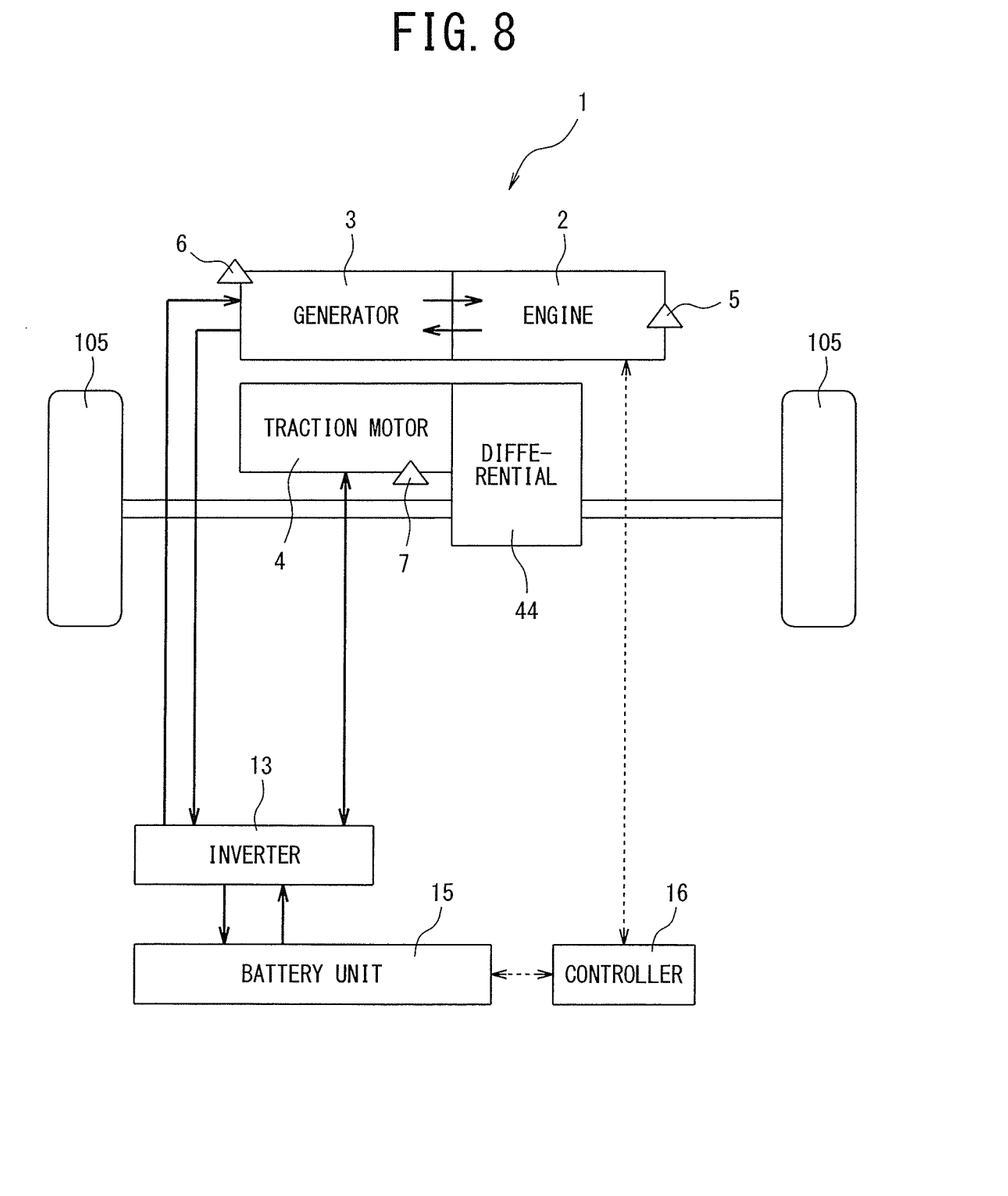
FIG. 8 is a block diagram of the hybrid vehicle that carries the one implementation of a power unit for a hybrid vehicle according to the present invention.

As shown in FIG. 1, the traction motor 4 is arranged to rotate driving wheels 105. As shown in FIG. 8, a differential 44 is arranged between the traction motor 4 and the driving wheels 105. As seen from FIGS. 1, 4 and 5, the traction motor 4 has a rear, with respect to the longitudinal axis of the vehicle 100, portion attached to the sub frame 103 via the traction motor mount 7. It is noted that a mounting bracket 43 is provided on the rear portion of the traction motor 4. As shown in FIG. 5, the traction motor mount 7 includes a cylindrical outer race 71, a cylindrical inner race, not illustrated, within the outer race 71, and an anti-vibration rubber 72 between the outer race 71 and the inner race. The bottom of the cylindrical outer race 71 is attached to the surface of the sub frame 103. A support shaft (bolt) 73 passes through the cylindrical inner race. The support shaft 73 is pivotally supported by the mounting bracket 43.

(Generator)

As shown in FIGS. 1, 4 and 5, the generator 3 has a mounting bracket 32 protruding from that one end 31 (the mount side end on the vehicle left side) of its axially spaced, along the transverse direction of the vehicle 100, ends which is not adjacent the engine 2. As shown in FIG. 5, the end 31 of the generator 3 is generally circular-shaped. This mounting bracket 32 includes, as integral portions, a junction base portion 32A fixed to the end 31 of the generator 3 by fastening, an arm portion 32B and an end portion or a mount connecting portion 32C.

As shown in FIG. 5, the junction base portion 32A is tabular and creates a roughly five point pentagon shape. This junction base portion 32A is wide enough to cover almost all area of the end 31. The junction base portion 32A has an outline extending along an outer edge of the end 31. In the neighborhood of the periphery of the junction base portion 32A, there are provided a group of two or more (four in this implementation) junctions 10A, 10B, 10C and 10D arranged along an arc of the outer edge of the end 31 from one limit of the arc to the other with a roughly fixed interval. Each of these junctions 10A, 10B, 10C and 10D is accomplished by fastening the junction base portion 32A to the end 31 by one of bolts 11.

If, as FIG. 5 shows, the end 31 is divided by an imaginary vertical plane 3B that includes the axis 3A of the generator 3 into a front area and a rear area with respect to the longitudinal axis of the vehicle 100, the arrangement of junctions 10A, 10B, 10C and 10D is such that the number of some of the plurality of junctions located in the rear area is larger than the number of the remainder of the plurality of junctions located in the front area. In the neighborhood of an area where the generator 3 and traction motor 4 meet (come into contact with) each other, the junctions 10A, 10B, 10C, 10D and the joints 9A, 9B are arranged alternately along the circumference of the generator 3. Thus, as can be seen from FIG. 5, the row of upper joints 9A is arranged between the junction 10A and the junction 10B, and the row of lower joints 9B is arranged between the junction 10B and the junction 100. Specifically, as FIG. 5 shows, the length of the shortest line segment L1 joining the junction 10A and the adjacent one of the row of upper joints 9A and the length of the shortest line segment L2 joining the junction 10B and the upper joint 9A are approximately the same. Likewise, the length of the shortest line segment L3 joining the junction 10B and the adjacent one of the row of lower joints 9B and the length of the shortest line segment L4 joining the junction 100 and the lower joint 9B are approximately the same.

Figure 6:
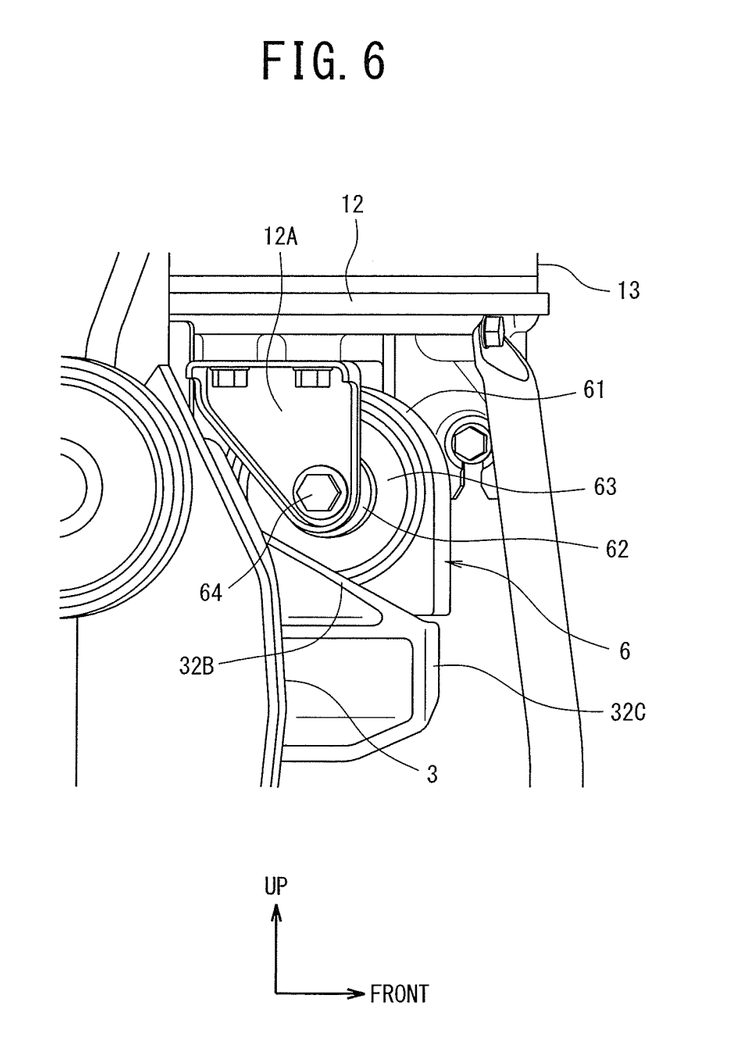
FIG. 6 is a side view showing a generator mount as viewed inside an engine compartment along a transverse direction of the hybrid vehicle.

The arm portion 32B on the joint base portion 32A of the mounting bracket 32 extends diagonally forward and outward with respect to the longitudinal axis of the vehicle 100. The arm portion 32B terminates at the end at which it is connected to the mount connecting portion 32C that includes a roughly horizontal upper surface. Attached to the upper surface of the mount connecting portion 32C is the generator mount 6. As shown in FIG. 6, the generator mount 6 includes a cylindrical outer race 61, a cylindrical inner race 62 within the outer race 61, an anti-vibration rubber 63 between the outer race 61 and the inner race 62, and a support shaft (bolt) 64 that passes through the cylindrical inner race 62. The cylindrical outer race 61 is fixed to the upper surface of the mount connecting portion 32C. One and the opposite ends of the support shaft 64 are pivotally supported by a pair of vertical walls 12A of an inverter bracket 12. The present implementation provides setting that the generator mount 6 is arranged in front of the axis 3A (imaginary vertical plane 3B). According to the present implementation, as shown in FIG. 4, an axis 64A of the support shaft 64 of the generator mount 6 is arranged in front of the front side portion of the generator 3 with respect to the longitudinal axis of the vehicle 100.

As shown in FIGS. 1 and 3, the inverter bracket 12 is attached to an upper wall portion of the side member 102L. The vertical walls 12A of the above-mentioned pair protrude in parallel from the bottom surface of the inverter bracket 12. As shown in FIG. 2, an inverter 13 is attached to the upper surface of the inverter bracket 12. As shown in FIG. 8, the inverter 13 is connected to the traction motor 4 and the battery unit 15. The battery unit 15 and the engine 2 are connected to a controller 16. The controller 16 controls the engine 2 based on data of state of charge in the battery unit 15.

(Operation and Effect of Power Unit)

Next, the operation and effect of the power unit 1 are explained. In the vehicle 100, the battery unit 15 is recharged by driving the generator 3 by the engine 2. The recharged battery unit 15 supplies electric power, making the traction motor 4 to turn to rotate driving wheels 105. The engine mount 5 absorbs slight vibration made by the engine 2 when the vehicle 100 is in motion, the slight vibration involving mainly jolt caused due to rotation arising in the circumference of the crankshaft of the engine 2. In the present implementation, the engine mount 5 is attached to the upper wall portion of the side member 102R with the axis of the cylindrical inner race (not illustrated) of the engine mount 5 oriented in vertical direction of the vehicle 100. This makes it easy to approach the engine mount 5 (or its tightening bolt) from above the vehicle 100 using the tool configured to tighten (or loosen) a bolt.

Referring to the operation of the traction motor 4 upon starting the vehicle 100 from a standstill, there is generally a considerable change in revolutions per minute of (an internal rotor of) the traction motor 4 caused due to supply of electricity from the battery unit 15. On this occasion, there is instantaneous transmission of vibration larger in amplitude than that of the engine 2 or reaction to the generator 3 from the traction motor 4 (to front from back) due to excessive torque of the traction motor 4. This vibration or reaction transmitted to front from back of the vehicle 100 is efficiently absorbed because, in the present implementation, the axis 64A of the support shaft 64 of the generator mount 6 is oriented along the transverse direction (side to side) of the vehicle 100.

Upon stopping the vehicle 100, rotation of the traction motor 4 stops due to suspension of supply of electricity from the battery unit 15 to the traction motor 4. There is no vibration generated by the traction motor 4 itself when the vehicle 100 is stopped. Next, upon stating the vehicle 100, there is a considerable change in revolutions per minute of the traction motor 4 at the time of beginning to supply electricity from the battery unit 15 to the traction motor 4, causing the traction motor 4 to generate excessive torque. If, in this manner, the traction motor 4 generates excessive torque, the traction motor considerably vibrates in directions (back to front and front to back) along the longitudinal axis of the vehicle 100. The considerable vibration of this kind is efficiently absorbed by means of the generator mount 6 having the structure described in the foregoing for supporting the power unit 1 used in the present implementation.

Comparing the number of junctions located in the front area of the end 31 of the generator in front of the imaginary vertical plane 3B with respect to the longitudinal axis of the vehicle 100 to the number of junction(s) located in the rear area of the end 31 in the rear of the imaginary vertical plane 3, the arrangement of junctions 10A, 10B, 100 and 10D is such that the number of some of the plurality of junctions located in the rear area is larger than the number of the remainder of the plurality of junctions in the front area. That area of the junction base portion 32A of the mounting bracket 32 which is located in the neighborhood of where the generator 3 and traction motor 4 meet (come into contact with) each other is fastened to the end 31 with many junctions 10A, 10B and 10C. Even if there is instantaneous transmission of large vibration or reaction to the generator 3 from the traction motor 4 due to excessive torque of the traction motor 4 upon starting the vehicle 100 from a standstill, the vibration or reaction transmitted from the traction motor 4 to the generator 3 is shared across the plurality of junctions 10A, 10B, 10C and 10D, thus avoiding centralization of vibration (load) on only one junction. This prolongs life (fatigue life) of each of the junctions 10A, 10B, 10C and 10D and stabilizes the connection between the mounting bracket 32 and the generator 3 because stress is shared across the junctions 10A, 10B, 100 and 10D.

In addition, according to the power unit 1 used in present implementation, in the neighborhood of where the generator 3 and traction motor 4 meet (come into contact with) each other, the row of upper joints 9A is arranged between the junction 10A and the junction 10B, and the row of lower joints 9B is arranged between the junction 10B and the junction 100. According to the power unit 1 used in the present implementation, the junctions (10A, 10B, 10C) and the joints (9A, 9B) are arranged alternately along the circumference of the generator 3, thus preventing uneven distribution of load to each of the joints (9A, 9B) and junctions (10A, 10B, 10C). Thus, the power unit 1 used in the present implementation provides improved durability of each of the joins (9A, 9B) and junctions (10A, 10B, 10C) even when excessive torque may be derived from the traction motor 4.

According to the power unit 1 used in the present implementation, the contact area between the mounting bracket 32 and the generator 3 may be expanded to the fullest extent possible because the base portion 32A of the mounting bracket 32 that is to be attached to the generator 3 is configured to follow along the outer edge of the end 31 in a way the outline of the base portion 32A runs along substantially the outer edge of the end 31. This causes the power unit 1 used in the present implementation to stably hold the mounting bracket 32 against the end 31.

Furthermore, viewing the vehicle 100 in the transverse direction, a space that surrounds the traction motor 4 side of the generator 3 is expanded because the generator mount 6 is located at a position that protrudes in a forward direction of the vehicle 100 from the axis 3A (the vertical imaginary plane 3B) of the generator 3. This exposes and so allows easy visual inspection of the junctions 10A, 10B, 100, 10D on the traction motor 4 side as the power unit 1 is viewed in the transverse direction of the vehicle 100. This enables approach of a tool configured to tighten (or loosen) a bolt (impact wrench or socket) to each of the junctions 10A, 10B, 10C, 10D without any obstruction of the mounting bracket 32 (or side walls of the mounting bracket) for easy operation of the tool during work to attach the mounting bracket 32 to the generator 3 via bolts 11. As a result, the performance of workers is improved caused due to a reduction in the work load. Since it is easy to perform visual inspection of the base portion 32A of the mounting bracket 32 as the power unit 1 is viewed in the transverse direction of the vehicle 100, it is possible to reinforce connection between the mounting bracket 32 and the generator 3 by increasing the number of junctions 10A, 10B, 10C, 10D.

Figure 7:
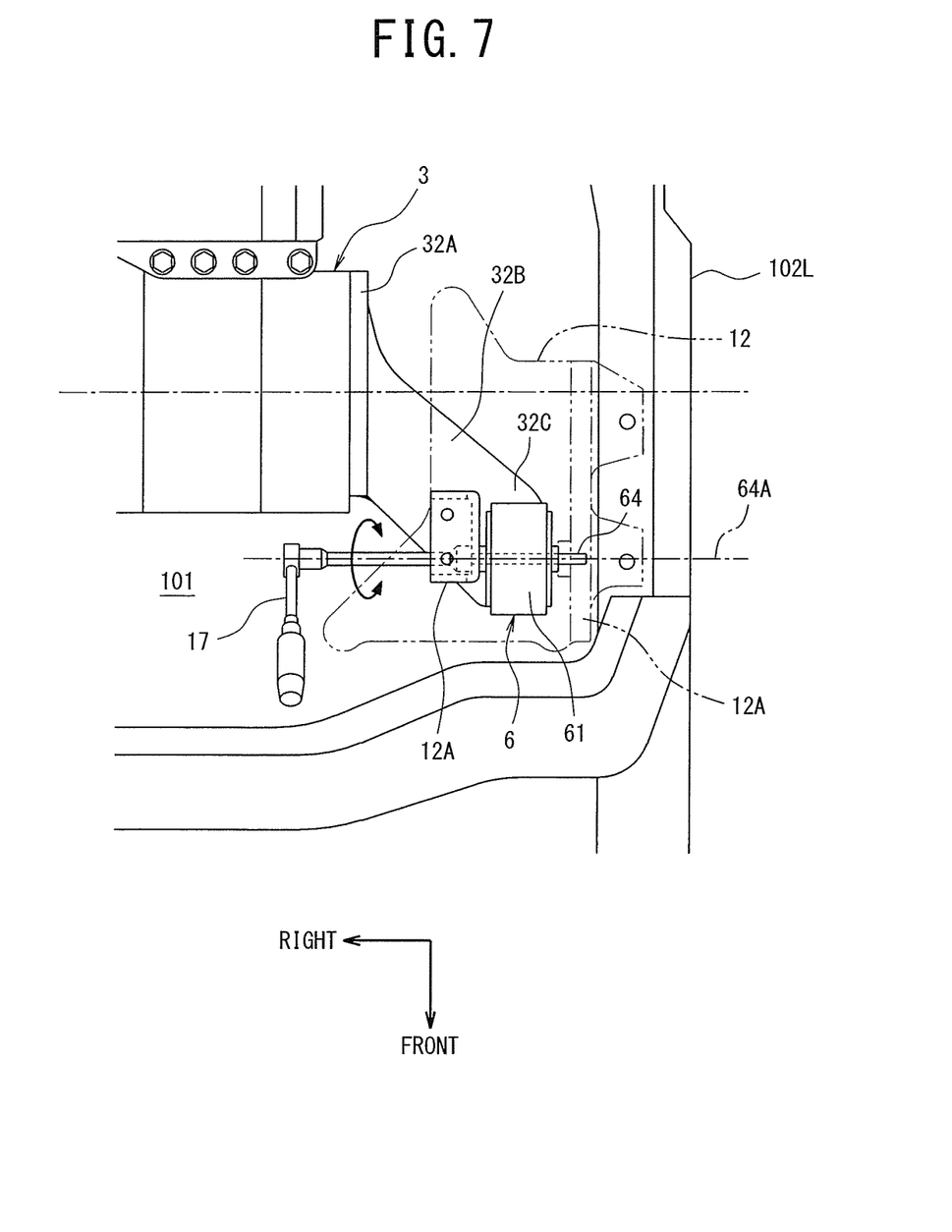
FIG. 7 is a plan view showing how a tool is used, that is, a view of the neighborhood of the generator mount as viewed from above the hybrid vehicle.

As shown in FIG. 7, the tool 17 can be easy to use during work to tighten or release the support shaft (bolt) 64 because, viewing the vehicle 100 along the transverse direction from inside the engine compartment 101, it is easy to perform visual inspection of the support shaft (bolt) 64 as seen in FIG. 6. Therefore, the worker can easily perform maintenance of the generator mount 6 and removal or attachment of the power unit 1. The present implementation provides a considerable reduction in workload because it is in particular become easy to remove the power unit 1 upward from the engine compartment of the vehicle 100.

(Other Implementations)

With regard to the foregoing description of the implementation, it should not be understood that the statements and the drawings which make a part of the disclosure of the implementation limit the present invention. From this disclosure, various forms of alternative implementations, embodiments and operation technology may be clear to those skilled in the art.

In the foregoing implementation, the present invention is applied to one example of power units for hybrid vehicles, but it may be applied to other example in which, for example, the arrangement of an engine 2, a generator 3 and a traction motor 4 is modified as necessary. Moreover, according to the present invention, the number of junctions 10A to 10D and that of joints 9A, 9B are not limited to those in the foregoing implementation.

EXPLANATION OF NOTATIONS 1 power unit (power unit for a hybrid vehicle)
2 engine
2A crankshaft axis
3 generator
3A rotor axis
3B imaginary plane
4 traction motor
4A rotor axis
5 engine mount
6 generator mount
7 traction motor mount
9A upper joint
9B lower joint
10A, 10B, 10C, 10D junctions
11 bolt
12 inverter bracket
12A vertical walls
13 inverter
15 battery unit
17 tool
31 end (end near the mount)
32 mounting bracket
32A junction base portion
32B arm portion
32C mount connecting portion
42A, 42B bolts
61 cylindrical outer race
62 cylindrical inner race
63 anti-vibration rubber
64 support shaft
100 vehicle (hybrid vehicle)
101 engine compartment
102R, 102L side members
103 sub frame

The invention claimed is:

1. A power unit for a hybrid vehicle, the hybrid vehicle including a vehicle body having an engine compartment, and a pair of side members spaced in a transverse direction toward both sides of the vehicle within the engine compartment and extending along a longitudinal axis of the vehicle, the power unit comprising:
an engine having a crankshaft with the crankshaft axis oriented along the transverse direction of the vehicle;
a generator connected to one end of the engine with respect to the crankshaft axis;
a traction motor, located in the rear of the generator with respect to the longitudinal axis of the vehicle, connected to the generator in a direction along a line that meets the crankshaft axis at right angles;
a mounting bracket protruding from that one end of the generator's axially spaced, along the transverse direction of the vehicle, ends which is not adjacent the engine, the mounting bracket having a base portion in contact with the end of the generator,
the base portion of the mounting bracket having an outline extending along an outer edge of the end of the generator and a plurality of junctions arranged along the outer edge of the end at a plurality of points spaced at interval to fasten the base portion to the end of the generator,
the plurality of junctions being arranged such that dividing the end of the generator by an imaginary vertical plane that includes a rotor axis of the generator into a front area and a rear area with respect to the longitudinal axis of the vehicle, the number of some of the plurality of junctions located in the rear area is larger than the number of the remainder of the plurality of junctions located in the front area; and
a generator mount between an end portion of the mounting bracket and one of the pair of side members and arranged in front of the imaginary vertical plane with respect to the longitudinal axis of the vehicle.

2. The power unit according to claim 1, wherein
within an area where the generator and the traction motor meet each other, there are a plurality of joints spaced along the circumference of an imaginary circle about a rotor axis of said traction motor in a side view viewing the area in a direction along the rotor axis, and the junctions and the joints are arranged alternately along the circumference of the generator in the neighborhood of the area where the generator and the traction motor meet each other.

3. A power unit for a hybrid vehicle, the hybrid vehicle including a vehicle body having an engine compartment, and a pair of side members spaced in a transverse direction toward both sides of the vehicle within the engine compartment and extending along a longitudinal axis of the vehicle, the power unit comprising:

an engine having a crankshaft with the crankshaft axis oriented along the transverse direction of the vehicle;

a generator connected to one end of the engine with respect to the crankshaft axis;

a traction motor, located in the rear of the generator with respect to the longitudinal axis of the vehicle, connected to the generator in a direction along a line that meets the crankshaft axis at right angles;

a mounting bracket protruding from that one end of the generator's axially spaced, along the transverse direction of the vehicle, ends which is not adjacent the engine, the mounting bracket having a base portion in contact with the end of the generator, the base portion of the mounting bracket having an outline extending along an outer edge of the end of the generator and a plurality of junctions arranged along the outer edge of the end at a plurality of points spaced at interval to fasten the base portion to the end of the generator, the plurality of junctions being arranged such that dividing the end of the generator by an imaginary vertical plane that includes a rotor axis of the generator into a front area and a rear area with respect to the longitudinal axis of the vehicle, the number of some of the plurality of junctions located in the rear area is larger than the number of the remainder of the plurality of junctions located in the front area; and a generator mount between an end portion of the mounting bracket and one of the pair of side members and arranged in front of the imaginary vertical plane with respect to the longitudinal axis of the vehicle, the generator mount including a cylindrical outer race, a cylindrical inner race within the outer race, an anti-vibration rubber between the cylindrical outer race and the cylindrical inner race, and a support shaft that passes through the cylindrical inner race, the cylindrical inner race having an axis oriented along the transverse direction of the vehicle with one and the opposite ends of said support shaft being supported on the side member, the cylindrical outer race having a bottom fastened to an upper surface of the one end portion of the mounting bracket by junctions at a plurality of points.

4. The power unit according to claim 3, wherein the one and the opposite ends of the support shaft are fastened to an inverter bracket attached to the side member.

5. The power unit according to claim 3, wherein the cylindrical inner race of said generator mount has an axis arranged in front of the front side portion of the generator with respect to the longitudinal axis of the vehicle.

6. The power unit according to claim 3, wherein within an area where the generator and the traction motor meet each other, there are a plurality of joints spaced along the circumference of an imaginary circle about a rotor axis of said traction motor in a side view viewing the area in a direction along the rotor axis, and the junctions and the joints are arranged alternately along the circumference of the generator in the neighborhood of the area where the generator and the traction motor meet each other.

* * * * *